Aug. 31, 1965  R. K. CALVERT ETAL  3,203,219
JOGGLE FORMING APPARATUS
Filed June 12, 1961  2 Sheets-Sheet 1
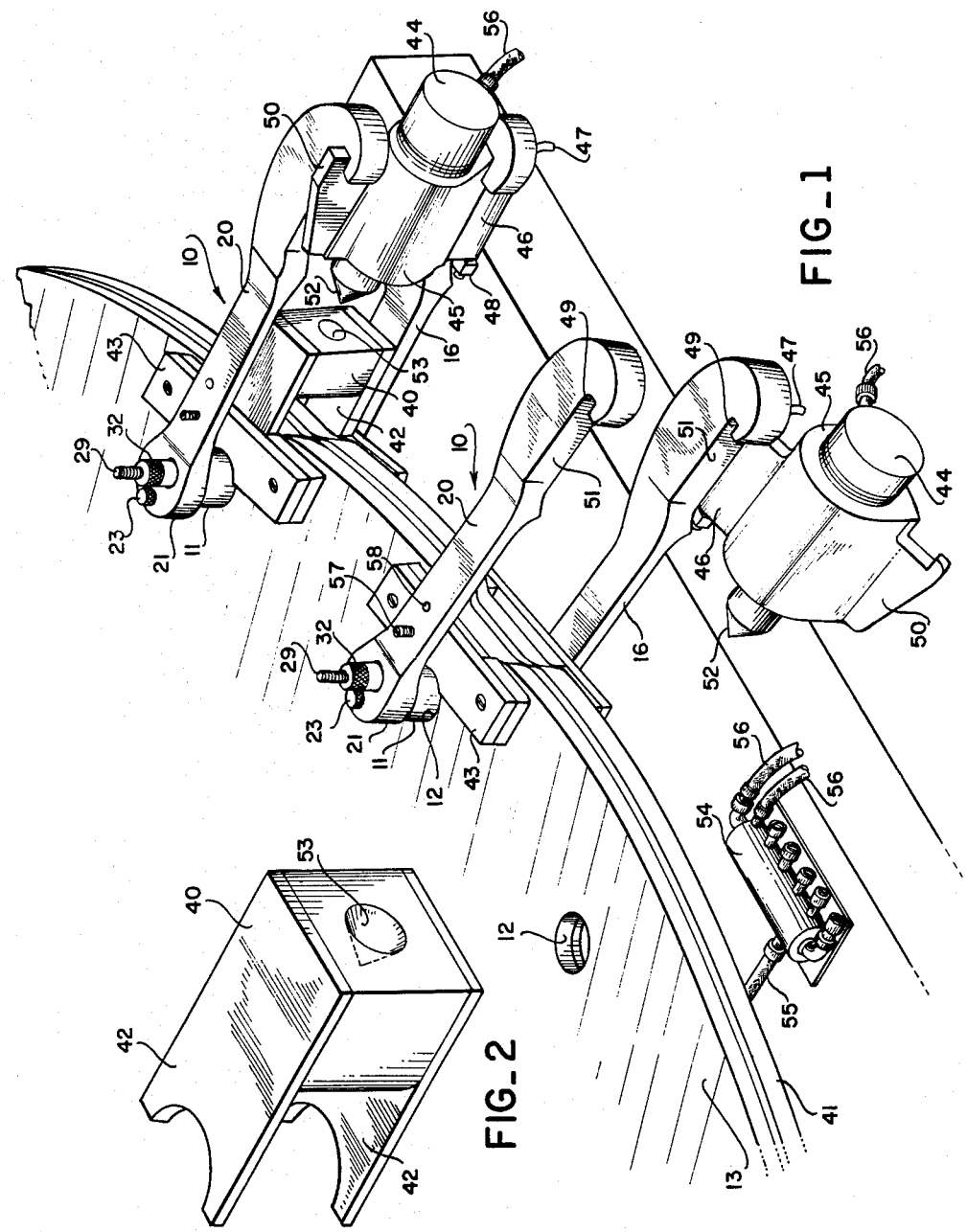
INVENTORS
RODNEY K. CALVERT
SAM L. WOHAR
By
Agent

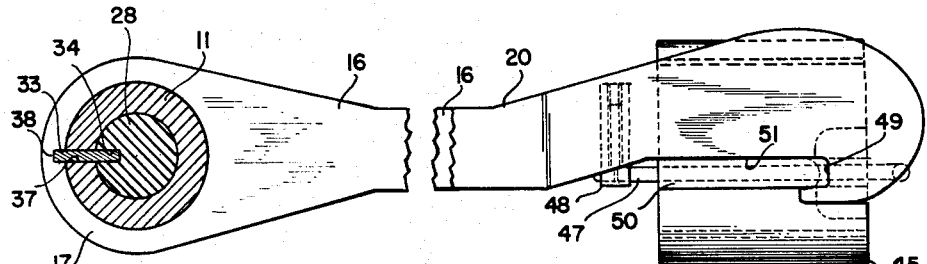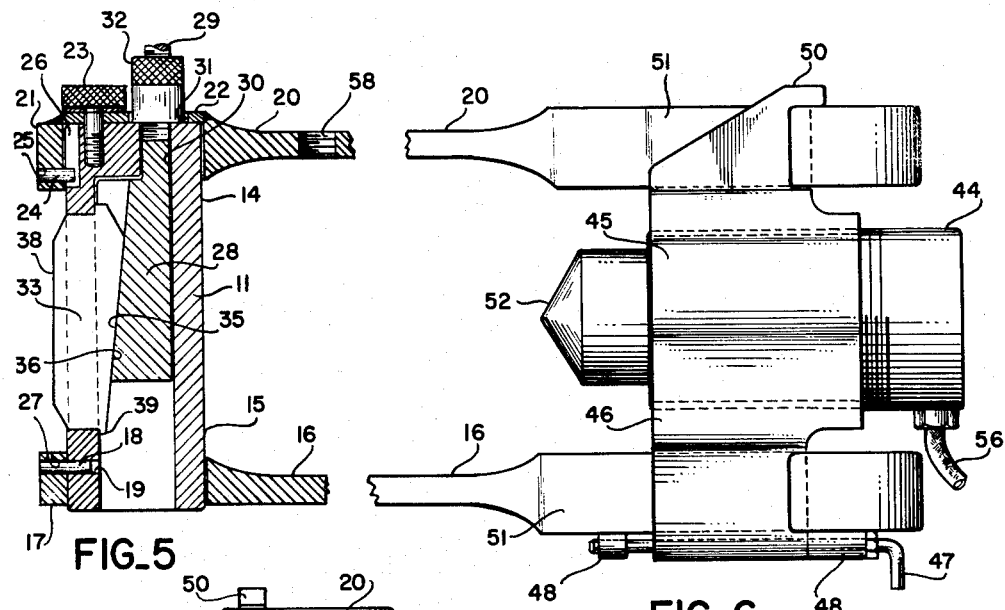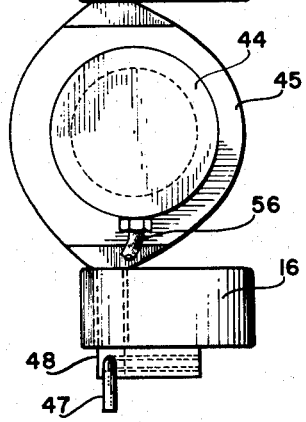

United States Patent Office 3,203,219
Patented Aug. 31, 1965

3,203,219
JOGGLE FORMING APPARATUS
Rodney K. Calvert, Dunwoody, and Sam L. Wohar, Decatur, Ga., assignors to Lockheed Aircraft Corporation, Burbank, Calif.
Filed June 12, 1961, Ser. No. 116,533
4 Claims. (Cl. 72—386)

This invention relates to joggling machines, and more particularly to a joggling machine for forming joggles in metal which is in stressed or stretched condition on a stretch press, stretch wrap forming machine or other metal-forming machine tool.

In the fabrication of steel, aluminum and other metal items for industrial and commercial purposes, a frequently required operation is the forming of joggles. For example, aircraft components such as ribs and stringers are typically fabricated with one or more joggles spaced along their length in order to provide recesses or channels through which other components may pass the rib or stringer in the assembled aircraft without distorting the basic configuration or contour which it is desired to describe by the rib or stringer.

Although a variety of fabrication techniques are used to fabricate components such as aircraft stringers and ribs, such components are often fabricated by using stretch presses, stretch wrap forming machines or other similar machine tools to stretch a piece of metal against the forming contour of a form block or other forming surface. Although such machine tools differ with respect to whether the metal is stretched and the forming contour forced against the metal or whether the metal is stretched and wrapped or pulled against the forming contour, it is apparent that all of these machine tools involve the application of forming pressure to only one side of the metal. This is somewhat like stretching a rubber band about a surface and it is well known that the configuration of a metal component which can be obtained by the use of these machine tools is limited.

This limitation is encountered when it is desired to form an aircraft part such as a rib or stringer having joggles using a machine tool such as a stretch press or stretch wrap forming machine and results from the fact that the forming of joggles generally requires that the metal be forced in a direction which is perpendicular to the axis along which the metal is being stretched and opposite to that direction in which the form block tends to force the metal. In essence, the limitation results from the fact that the metal is being formed against one contour and not between two contours such as the faces of two dies.

Thus, although a form block may provide in its contour for an appropriately placed joggle, there is no tendency for the metal to move in a direction opposite to the forces being applied to it and assume the contour of the joggle. Therefore, it is common industrial practice to form joggles in metal components by using joggle blocks which are forced against the exposed surface of the metal while the metal is in stretched condition on a stretch wrap forming machine or similar machine tool. To facilitate the accurate forming of joggles in this manner, the form blocks used on various metal-forming machine tools are generally provided with joggle guides which guide a joggle block along a specific line of motion as it is moved toward the forming surface of the form block and with alignment holes whose centers are in the specific lines of motion. These holes serve as appropriately placed points for attaching some means for pulling the joggle block along the specific line of motion toward the form block. It should be noted that not only can joggles be formed with such an arrangement, but that the forming of joggles while the metal is in stressed or stretched condition tends to eliminate the effects of metal springback which would otherwise distort the depth or dimension of the joggles.

The difficulty with forming joggles as described above is that considerable force must be applied to a joggle block in order to move the metal into the joggle configuration of the form block. In the past, this force has generally been obtained by using various methods such as squeezing the joggle block toward the form block with a C clamp having one end inserted in one of the holes in the form block described above. This method and others using similar mechanical arrangements for forcing joggles into metal components are not only cumbersome and slow in setup and in use, but they are limited with respect to the amount of force which can be applied to a joggle block. Therefore, many joggles could not be accurately formed and some could not be formed at all with previously existing arrangements for forcing joggle blocks against metal.

The invention described herein completely eliminates the foregoing difficulties in forming joggles since it provides a convenient means for rapidly applying great force to a joggle block. Although this feature in itself makes the invention extremely useful in that it permits the forming of many joggles which could not previously be accurately formed or formed at all, the invention also possesses the feature of being easily and quickly positioned or set up for operation and of not interfering with the loading of components into the metal-forming machine tool with which it is being used. Moreover, although the invention will form a single joggle in substantially less time and more efficiently than previously possible, it is also capable of multiple use so as to permit the simultaneous forming of a plurality of joggles in a metal component.

These and other features of the invention will be more clearly understood from the following detailed description and the accompanying drawings in which like characters designate corresponding parts in all figures and in which:

FIGURE 1 is a perspective view of two joggling machines mounted on the form block of a stretch wrap forming machine and shows one joggling machine with its ram mounting portion and a joggle block positioned for forming a joggle in a metal component stretched against the form block and the other joggling machine without a joggle block and with its ram mounting portion rotated into the loading and unloading position.

FIGURE 2 is a perspective view of a conventional joggle block modified with the addition of a ram nose receiving recess.

FIGURE 3 is a sectional view of the positioning portion of the jogging machine taken in a plane perpendicular to the positioning pin and passing through the positioning pin approximately half-way between its two ends and shows the positioning pin, the expanding shaft, and the expanding insert in section, but with the lower arm in plan view.

FIGURE 4 is a top plan view of the ram mounting portion of the joggling machine and shows the ram support cylinder in ram operating position between the upper arm and the lower arm.

FIGURE 5 is a sectional view of the positioning portion of the joggling machine taken in a plane through the center lines of the expanding shaft and the upper and lower arms and shows the positioning pin, the expanding shaft, the upper arm, and the lower arm in section, but with the expanding insert and other details in side elevation.

FIGURE 6 is a side elevational view of the ram mounting portion of the joggling machine and shows a ram inserted into the ram support cylinder and positioned between the upper arm and the lower arm for ram operation.

FIGURE 7 is a back elevational view of the ram mounting portion of the joggling machine which is shown in FIGURE 6 and shows this portion as it is seen when viewed in the direction of ram motion.

These figures and the following detailed description disclose a preferred specific embodiment of the invention, but the invention is not limited to the details disclosed since it may be embodied in other equivalent forms.

The joggling machine disclosed herein is comprised of a positioning portion and a ram mounting portion. It is the positioning portion which is used to fixedly position the joggling machine with reference to a metal component in which a joggle is to be formed and it is in the ram mounting portion that a hydraulic ram or other suitable power source is mounted to force a joggle block against the metal component. In the specific embodiment of the invention described herein, these two portions of the joggling machine and all components of the joggling machine are specifically adapted for forming joggles in metal components which are being stretched by a stretch wrap forming machine against a horizontally positioned form block. Therefore, although the joggling machine can be used in connection with other types of metal-forming machine tools and where the form block or other forming structure is not horizontal with only minor changes in its parts and often without any such changes, the description of the joggling machine which follows is based upon using the joggling machine with a horizontally positioned form block.

The basic structural element of the positioning portion of the joggling machine 10 is the positioning pin 11 which is slidably inserted into one of the alignment holes 12 generally provided in a form block 13. When the positioning pin 11 is properly inserted, its upper end 14 extends above the form block 13 and its lower end 15 extends below the form block 13 and it is to these two extending ends 14 and 15 of the positioning pin 11 that two arms joining the positioning portion and the ram mounting portion of the joggling machine 10 are attached. Attachment of the lower arm 16 to the positioning pin 11 is achieved by forming one end of the lower arm 16 as a cylinder 17 into which the lower end 15 of the positioning pin 11 slides. This cylinder 17 of the lower arm 16 is maintained in position on the lower end 15 of the positioning pin 11 by inserting a dowel pin 18 through a dowel hole 27 in the cylinder 17 of the lower arm 16 and into a dowel hole 19 in the lower end 15 of the positioning pin 11. Although this dowel pin 18 effectively restricts all motion of the positioning pin 11 and lower arm 16 with respect to each other, this method of attaching lower arm 16 to the positioning pin 11 permits the lower arm 16 to be conveniently removed from the positioning pin 11 when necessary.

However, removal of the lower arm 16 from the positioning pin 11 is only occasionally necessary since the removal of one arm will generally be sufficiently to permit inserting of the positioning pin 11 into an alignment hole 12 and since the upper arm 20 is constructed for easy and quick removal from the positioning pin 11. Such removal of the upper arm 20 is provided by also forming one end of the upper arm 20 as a cylinder 21 which is substantially identical to the cylinder 17 of the lower arm 16, but which is closed at its top by a plate 22 to form a cylindrical cavity. Therefore, when the upper end 14 of the positioning pin 11 is inserted into the cylindrical cavity, this structural feature of the upper arm 20 will tend to vertically position the upper arm 20 with respect to the positioning pin 11 while permitting easy removal of the upper arm 20 from the positioning pin 11.

However, simply inserting the upper end 14 of the positioning pin 11 into the cylindrical cavity of the upper arm 20 will not prevent the upper arm 20 from being forced from the upper end 14 of the positioning pin 11 or from being rotated about the positioning pin 11 during operation of the joggling machine 10. Therefore, a thumb screw 23 is inserted through the plate 22 into the top of the positioning pin 11 in order to positively prevent vertical motion of the upper arm 20 with respect to the positioning pin 11. Moreover, although the thumb screw 23 will tend to restrict the rotational movement of the upper arm 20 with respect to the positioning pin 11, such rotational movement is positively restricted by extending a dowel pin 24 through a dowel hole 25 in the cylinder 21 of the upper arm 20 and into a dowel pin slot 26 in the upper end 14 of the positioning pin 11.

It should be noted that this dowel pin slot 26 extends from the upper edge of the cylindrical surface of the positioning pin 11 down the side of the positioning pin 11 for that distance traversed by the dowel pin 24 as the positioning pin 11 is fully inserted into the cylindrical cavity of the upper arm 20. Thus, the dowel pin 24 through the cylinder 21 of the upper arm 20 and the dowel pin slot 26 provide a convenient means for preventing the rotation of the upper arm 20 with respect to the positioning pin 11, but do not in themselves restrict the vertical movement of positioning pin 11 and upper arm 20 with respect to each other. Therefore, the cylindrical cavity, the thumb screw 23, the dowel pin 24 and dowel pin slot 26 cooperate to permit the upper arm 20 to be conveniently and quickly positioned on or removed from the upper end 14 of the positioning pin 11 while at the same time preventing vertical and rotational motion of the upper arm 20 and positioning pin 11 with respect to each other.

When the upper arm 20 and lower arm 16 are attached to the positioning pin 11 in the manner described above, it is desirable that the center lines of the positioning pin 11, the upper arm 20 and the lower arm 16 all be in the same vertical plane for reasons which will become apparent. This center line orientation is achieved by forming the upper arm 20 and the lower arm 16 so that when they are attached to the positioning pin 11, the center line of the upper arm 20 intersects the center line of the positioning pin 11 and the center line of the lower arm 16 intersects the center line of the positioning pin 11 and by placing the dowel hole 27 in the lower arm 16, the dowel hole 25 in the upper arm 20, the dowel hole 19 in the lower end 15 of the positioning pin 11 and the dowel pin slot 26 in the upper end 14 of the positioning pin 11 in those positions which will cause the center line of the upper arm 20 and the center line of the lower arm 16 to extend from the positioning pin 11 in exactly the same radial direction.

Thus, the upper arm 20 and the lower arm 16 are so attached to the positioning pin 11 that the direction in which they extend is directly related to the radial position of the positioning pin 11 in the alignment hole 12 of a form block 13. Moreover, the vertical position of the upper arm 20 with reference to the form block 13 and of the lower arm 16 with reference to the form block 13 is determined by the vertical position of the positioning pin 11 within the alignment hole 12 of the form block 13. Therefore, the position of the upper arm 20 and the position of the lower arm 16 with respect to the alignment hole 12 in the form block 13 are determined by the accurate positioning of the positioning pin 11 in the alignment hole 12.

The accurate positioning of the positioning pin 11 in the alignment hole 12 of a form block 13 is achieved by constructing the positioning pin 11 so that its effective diameter may be conveniently and quickly expanded or contracted. It should be noted that such an arrangement not only makes it possible to expand the effective diameter of the positioning pin 11 after it has been inserted in the alignment hole 12 of a form block 13 so that vertical and rotational motion of the positioning pin 11 can be restricted, but that it also makes possible the use of a positioning pin 11 having a contracted diameter which is sufficiently less than the diameter of the alignment hole 12 in which it is inserted to permit easy insertion and removal. Thus, the expandable-contractible effective diameter of the positioning pin 11 not only permits the positioning pin 11 to be fixedly positioned within an alignment hole 12 in a form block 13, but in combination with the readily removable upper arm 20 permits the positioning portion of the joggling machine to be quickly and conveniently placed in position.

Specifically, the positioning pin 11 is given an expandable-contractible effective diameter by constructing it as a hollow cylinder open at the lower end 15, but closed at the upper end 14 in order to provide a solid portion into which the thumb screw 23 is inserted in the manner already described. Within the interior of the positioning pin 11 is inserted an expanding shaft 28 having a diameter sufficiently less than the diameter of the interior of the positioning pin 11 to permit vertical motion of the expanding shaft 28 inside the positioning pin 11. Vertical motion of the expanding shaft 28 within the positioning pin 11 is obtained by extending a positioning shaft 29 from the top of the expanding shaft 28 through an access hole 30 in the closed end of the positioning pin 11 and similar hole 31 in the plate 22 of the upper arm 20 so that the vertical motion of the positioning shaft 29 can be used to impart vertical motion to the expanding shaft 28.

Although a variety of means can be used to vertically move the positioning shaft 29 and as a result move the expanding shaft 28, a convenient arrangement is obtained by simply threading the positioning shaft 29 to accommodate a threaded thumb nut 32 having a diameter which makes it too large to pass through the access hole 30 in the top of the positioning pin 11. Therefore, when the thumb nut 32 is rotated with its vertical motion restricted by the top of the positioning pin 11, its rotation will either raise or lower the positioning shaft 29 and the expanding shaft 28.

It is this vertical motion of the expanding shaft 28 as the result of the vertical motion of the positioning shaft 29 which is used to expand the effective diameter of the positioning pin 11. This is accomplished by causing the vertical motion of the expanding shaft 28 to move an expanding insert 33 in a direction perpendicular to the axis or center line of the positioning pin 11. The expanding insert 33 is a flat plate and its motion is obtained by inserting a portion of the expanding insert into a longitudinal camming slot 34 extending the length of the expanding shaft 28 and having a depth toward the center line of the expanding shaft 28 which increases at a uniform rate along its length to form an interior or camming surface 35 sloping toward the center line of the expanding shaft 28. Since the innermost edge 36 of that portion of the expanding insert 33 which is inserted into the camming slot 34 has a contour sloping toward the center line of the expanding shaft 28 in the same manner as the camming surface 35 and since vertical movement of the expanding insert 33 is restricted, the camming surface 35 of the expanding shaft 28 will act upon the innermost edge 36 of the expanding insert 33 to cause the expanding insert 33 to move smoothly toward and away from the center line of the expanding shaft 28 as the expanding shaft 28 moves up or down within the positioning pin 11.

Vertical movement of the expanding insert 33 is prevented by extending the expanding insert 33 through a longitudinal slit 37 in the positioning pin 11 having a length just sufficient to accommodate the sliding motion of the expanding insert 33, but which will prohibit vertical motion of the expanding insert 33. It is readily apparent that as the expanding insert 33 slides within the longitudinal slit 37 in the positioning pin 11, a greater or smaller amount of the expanding insert 33 will be projected from the positioning pin 11, and that this projection of the expanding insert 33 will increase or decrease the effective diameter of the positioning pin 11.

It should be noted that the outermost edge 38 of that portion of the expanding insert 33 which is projected to vary the effective diameter of the positioning pin 11 has a length parallel to the center line of the positioning pin 11 which is sufficiently long to vary the diameter of the positioning pin 11 along enough of its length to overcome any tendency for the axis or center line of the positioning pin 11 to tilt about an expanded diameter. In addition, it should be noted that the amount by which the expanding insert 33 will increase the effective diameter of the positioning pin 11 varies from no increase when the position of the expanding shaft 28 permits the expanding insert 33 to be moved the maximum possible distance toward the center line of the expanding shaft 28 to that increase obtained when the expanding insert 33 is forced by the expanding shaft 28 to the position at which the tabs 39 on the expanding insert 33 engage the interior of the positioning pin 11.

Moreover, it should also be noted that the motion of the expanding insert 33 is in the vertical plane which contains the center lines of the positioning pin 11, the upper arm 20, and the lower arm 16. This is necessary because as mentioned above, alignment holes 12 in form blocks 13 are generally positioned so that their centers are in the line of motion to be followed by a joggle block 40 and for reasons to be mentioned, it is desirable to maintain the center lines of the upper arm 20 and the lower arm 16 in these positions which will cause them to pass through the center of the alignment hole 12. Thus, by expanding the effective diameter of the positioning pin 11 in the vertical plane containing the center lines of the upper arm 20 and lower arm 16, these center lines are not displaced with reference to the center of the alignment hole 12.

When the upper arm 20 and the lower arm 16 are positioned in alignment hole 12 as described above so that they extend beyond the periphery 41 of the form block 13 in the direction of desired joggle block 40 motion, the upper arm 20 and lower arm 16 will encompass between them the periphery 41 of the form block 13, a metal component positioned against the periphery 41 of the form block 13 and a joggle block 40 positioned adjacent to the form block 13 with its guide tabs 42 inserted into the joggle block guides 43 generally attached to form blocks 13 for guiding the movement of joggle blocks 40. Therefore, any convenient type of ram such as a hydraulic ram 44 can be mounted between the upper arm 20 and the lower arm 16 at a position more remote from the positioning pin 11 than the joggle block 40 and used as an effective means for moving the joggle block 40 against the metal component. It is evident that it is simply necessary to position the ram between the upper arm 20 and the lower arm 16 so that the line of motion of a ram 44 will coincide with the line of motion of the joggle block.

This positioning of the ram 44 is achieved in the ram mounting portion of the joggling machine 10 described herein by inserting the ram 44 into a ram support cylinder 45 positioned between the upper arm 20 and the lower arm 16. The ram support cylinder 45 is a hollow cylinder rotatably attached to the lower arm 16 by using an integral lower tab 46 through which a hinge pin 47 extending between hinge fittings 48 on the lower arm 16 is inserted. This hinge arrangement permits the ram support cylinder 45 to rotate about the hinge pin 47 into a position between the upper arm 20 and the lower arm 16 at which it is held by sliding the lower tab 46 along the hinge pin 47 into a retaining slot 49 in the lower arm 16 while at the same time sliding an upper tab 50 also integrally associated with the ram support cylinder 45 into a similar retaining slot 49 in the upper arm 20.

It should be noted that this arrangement for positioning of the ram support cylinder 45 between the upper arm 20 and the lower arm 16 effectively positions the ram support cylinder 45 between the upper arm 20 and the lower arm 16 while providing means for quickly removing the ram support cylinder 45 from its position between the upper arm 20 and the lower arm 16. Therefore, the ram support cylinder 45 may be quickly rotated out of position between the upper arm 20 and the lower arm 16 to permit the loading of metal components between the upper arm 20 and the lower arm 16 and into position on the form block 13. Thus, once the upper arm 20, the lower arm 16 and the positioning pin 11 are properly positioned with respect to the joggle block 40, the continued use of the joggling machine 10 for forming joggles in successive metal components simply requires that the ram support cylinder 45 be rotated into and out of ram operating position and the setup time for each metal component is substantially reduced.

It should also be noted at this point that when the ram support cylinder 45 is rotated between the upper arm 20 and the lower arm 16 as described above, its center line coincides with the desired line of motion of the joggle block 40. This is obtained in the specific embodiment of the invention described herein by offsetting the lower tab 46 and the upper tab 50 from the vertical plane containing the line of joggle block 40 motion by the amount which is necessary to place the center line of the ram support cylinder 45 in the line of joggle block 40 motion when the lower tab 46 is in contact with the engaging surface 51 of the lower arm 16 and the top tab 50 is in contact with the engaging surface 51 of the upper arm 20. Thus, the positioning portion and the ram mounting portion of the joggling machine 10 together provide for fixedly but movably positioning a hydraulic ram 44 or other source of power for joggle block 40 motion in exactly that position in which the motion of the ram 44 will cause the joggle block 40 to move in the direction necessary to form a joggle.

Although the necessary power for joggle block 40 motion can be obtained from a variety of ram types, hydraulic pressure is generally associated with machine tools such as a stretch wrap forming machine and good results are obtained by mounting a hydraulic ram 44 in the ram support cylinder 45. This is achieved by modifying a conventional hydraulic ram 44 so that it may be screwed into the threaded interior of the ram support cylinder 45, an arrangement which not only provides for secure positioning of the hydraulic ram 44 within the ram support cylinder 45 with respect to motion along its axis, but which also provides for varying the distance of the ram nose 52 from the joggle block 40 by twisting the hydraulic ram 44 into the ram support cylinder 45 for various distances. However, it should be noted that variations in the distance of the ram nose 52 from a joggle block 40 can also be accommodated by simply varying the length of the ram nose 52 used with a hydraulic ram 44. Moreover, engagement of the ram nose 52 with the joggle block 40 is improved by adding a ram nose recess 53 to the conventional joggle block 40.

Regardless of the type of ram 44 used, multiple use of the joggling machine 10 will permit the simultaneous forming of a plurality of joggles in a metal component. However, when a hydraulic ram 44 is being used as a power source, the simultaneous application of hydraulic pressure to a plurality of joggling machines 10 can be obtained by using a hydraulic manifold 54 having a single input line 55 and a plurality of output lines 56. When each of the output lines 56 is connected to one of the plurality of joggling machines 10 and hydraulic pressure controlled by varying the input pressure to the manifold 54, simultaneous operation of a plurality of joggling machines 10 is easily attained.

Although the joggling machine 10 is of obvious value when it is desired to form only one joggle in a metal component at a time, the use of a plurality of joggling machines 10 as in the foregoing manner serves to emphasize the many advantages of the joggling machine 10. This is because the ease with which a joggling machine 10 may be positioned with reference to a form block 13 and with which it permits the loading and unloading of metal components by simply rotating the ram support cylinder 45 from between the upper arm 20 and the lower arm 16 is particularly significant when several joggling machines 10 are being used simultaneously.

Moreover, used singly or in a multiple unit arrangement, the joggling machine 10 described herein possesses the advantage of imparting motion to a joggle block 40 along the most effective line of motion because the joggling machine 10 is so arranged that the center line of the ram support cylinder 45 is in the same vertical plane as the center lines of the upper arm 20, the lower arm 16 and the positioning pin 11. Not only does this arrangement permit the vertical and rotational motion of the positioning pin 10 to be used in the manner already described for accurately and conveniently aligning ram 44 motion with the line of motion of the joggle block 40, but it also provides for the maximum structural integrity of the joggling machine 10 by eliminating any tendency of the joggling machine 10 to twist during the application of force to a joggle block 40 because all forces are not being applied to it in the same plane.

With respect to vertical positioning, it should be mentioned that although the vertical position of the joggling machine 10 is easily maintained by the expansion of the positioning pin 11 in an alignment hole 12, control of vertical position can be improved by using a set screw 57 inserted through an appropriately placed hole 58 in the upper arm 20 to engage the top of the form block 13 or the top of the joggle block guides 43. A series of holes 58 are provided in the upper arm 20 for this purpose because the most convenient point for inserting the set screw 57 will often vary from one form block 13 to another.

In summary, whether used singularly or as a unit in a multiple arrangement, the joggling machine 10 described herein provides a means for applying great power to joggle blocks 40 without cumbersome and time consuming installation and under conditions which permit the convenient loading and unloading of metal components after the initial positioning of the joggling machine 10. Moreover, the actual joggling operation is substantially quicker than was possible with previous arrangements for forming joggles and the force available permits the accurate forming of some joggles which could not previously be accurately formed or formed at all.

What is claimed is:

1. A machine for imparting linear motion to a joggle block in a specific direction toward a metal forming surface and an alignment hole in the support for the metal forming surface comprising, in combination, a positioning pin fixedly inserted into the alignment hole and having two exposed ends; an upper arm having one end fixedly attached to one end of the positioning pin and having an extended end which is more remote from the metal forming surface than the joggle block and a lower arm having one end fixedly attached to the other end of the positioning pin and having an extended end which is more remote from the metal forming surface than the joggle block, said upper arm and said lower arm having the joggle block between them; a ram rotatably attached to the extended end of the lower arm and rotatable into an operating position adjacent to the joggle block at which it is fixedly engaged by the extended end of the upper arm and in which the ram line of motion extends towards the joggle block in the specific direction of joggle block motion; means for moving the ram along its line of motion to the extent necessary to engage and move the joggle block.

2. A pin for fixedly positioning tools and other structures attached to it with reference to a surface having a hole with a specific diameter from a range of diameters comprising, in combination, a hollow cylinder having an outer surface diameter less than the smallest diameter in the range of diameters and having a longitudinal slit extending along and through a portion of its length; an expanding shaft vertically movable within the hollow cylinder and having a longitudinal camming slot extending along its entire length to form a camming surface, said camming surface being positioned so that its distance from the longitudinal slit in the hollow cylinder varies in a uniform manner as the expanding shaft moves within the hollow cylinder; an expanding insert having an outer portion with an outer edge and slidably positioned within the slit in the hollow cylinder, an inner portion slidably extending into the camming slot with an edge engaging the camming surface and a tab portion between the outer portion and the inner portion which engages the interior of the hollow cylinder when the outer edge of the outer portion is moved that distance from the outer surface of the hollow cylinder equal to the difference between the outer surface diameter of the hollow cylinder and the largest diameter in the range of diameters; and means for moving the expanding shaft within the hollow cylinder and fixedly positioning it at that location at which it forces the outer edge of the outer portion of the expanding insert to extend beyond the surface of the hollow cylinder by a distance equal to the difference between the outer surface diameter of the hollow cylinder and the specific diameter of the hole.

3. A joggling machine for imparting motion to a joggle block in a specific direction toward a form block and an alignment hole in the form block with a specific diameter and whose center is in the same plane as the specific direction of motion of the joggle block comprising, in combination, a positioning pin with an expandable-contractible diameter and inserted into the alignment hole with its diameter expanded to equal the specific diameter of the alignment hole, said positioning pin having its center line in the same plane as the specific direction of motion of the joggle block and having two exposed ends; an upper arm and a lower arm having the joggle block between them, said upper arm extending from one exposed end of the positioning pin with its center line in the same plane as the specific direction of motion of the joggle block and having an extended end more remote from the positioning pin than the joggle block and said lower arm extending from the other exposed end of the positioning pin with its center line in the same plane as the specific direction of motion of the joggle block and having an extended end more remote from the positioning pin than the joggle block; a set screw passing through the upper arm with its lower end engaging the form block; a ram rotatably associated with the extended end of the lower arm and rotatable about the lower arm into a position adjacent to the joggle block at which it is fixedly engaged by the extended end of the upper arm with the line of ram motion in the same plane as the specific direction of motion of the joggle block; means for moving the ram along its line of motion until it engages and moves the joggle block.

4. A machine for imparting linear motion to a joggle block in a specific direction toward a metal forming surface and an alignment hole with a specific diameter from a range of diameters in a support for the metal forming surface comprising, in combination: a positioning pin insertable into the alignment hole and having two exposed ends; said positioning pin comprising a hollow cylinder having an outer surface diameter less than the smallest diameter in the range of diameters and having a longitudinal slit extending along and through a portion of its length, an expanding shaft vertically movable within the hollow cylinder and having a longitudinal camming slot extending along its entire length to form a camming surface, said camming surface being positioned so that its distance from the longitudinal slit in the hollow cylinder varies in a uniform manner as the expanding shaft moves within the hollow cylinder, an expanding insert having an outer portion with an outer edge and slidably positioned within the slit in the hollow cylinder, an inner portion slidably extending into the camming slot with an edge engaging the camming surface and tab portion between the outer portion and the inner portion which engages the interior of the hollow cylinder when the outer edge of the outer portion is moved that distance from the outer surface of the hollow cylinder equal to the difference between the outer surface diameter of the hollow cylinder and the largest diameter in the range of dimeters, and means for moving the expanding shaft within the hollow cylinder and fixedly positioning it at that location at which it forces the outer edge of the outer portion of the expanding insert to extend beyond the surface of the hollow cylinder by a distance equal to the difference between the outer surface diameter of the hollow cylinder and the specific diameter of the hole: an upper arm having one end fixedly attached to one end of the positioning pin and having an extended end which is more remote from the metal forming surface than the joggle block: a lower arm having one end fixedly attached to the other end of the positioning pin and having an extended end which is more remote from the metal forming surface than the joggle block; said upper arm and said lower arm having the joggle block between them: a ram support extending between the extended end of the upper arm and the extended end of the lower arm and having a hollow cylinder adjacent to the joggle block with a center line which extends toward the joggle block in the specific direction of the joggle block motion: a ram fixedly positioned in the hollow cylinder with its line of motion coinciding with the center line of the hollow cylinder: and, means for moving the ram along its line of motion to engage and move the joggle block.

References Cited by the Examiner
UNITED STATES PATENTS

| | | | |
|---|---|---|---|
| 85,465 | 12/68 | McKinny | 287—114 |
| 1,926,798 | 9/33 | Baumbach | 287—20.3 |
| 2,560,525 | 7/51 | Nyl | 287—20.3 |
| 2,619,149 | 11/52 | Self | 153—21 |
| 2,767,763 | 10/56 | Anderson | 153—21 |
| 2,792,044 | 5/57 | Strom | 153—21 |

CHARLES W. LANHAM, *Primary Examiner.*

WILLIAM J. STEPHENSON, *Examiner.*